United States Patent
Chung et al.

(10) Patent No.: US 9,652,947 B2
(45) Date of Patent: May 16, 2017

(54) HAPTIC DEVICE FOR PROVIDNG SOMESTHESIS BY USING MAGNETIC STIMULATION, AND METHOD USING SAME

(71) Applicant: KONKUK UNIVERSITY INDUSTRIAL COOPERATION CORP, Seoul (KR)

(72) Inventors: Soon Cheol Chung, Chungju-si (KR); Hyung Sik Kim, Chungju-si (KR)

(73) Assignee: KONKUK UNIVERSITY INDUSTRIAL COOPERATION CORP, Seoul (KR)

( * ) Notice: Subject to any disclaimer, the term of this patent is extended or adjusted under 35 U.S.C. 154(b) by 4 days.

(21) Appl. No.: 14/765,903

(22) PCT Filed: Nov. 12, 2013

(86) PCT No.: PCT/KR2013/010234
§ 371 (c)(1),
(2) Date: Aug. 5, 2015

(87) PCT Pub. No.: WO2014/123296
PCT Pub. Date: Aug. 14, 2014

(65) Prior Publication Data
US 2015/0371509 A1 Dec. 24, 2015

(30) Foreign Application Priority Data

Feb. 8, 2013 (KR) ........................ 10-2013-0014228

(51) Int. Cl.
*G08B 6/00* (2006.01)
*G06F 3/01* (2006.01)
*G09B 21/00* (2006.01)

(52) U.S. Cl.
CPC .............. *G08B 6/00* (2013.01); *G06F 3/016* (2013.01); *G09B 21/003* (2013.01)

(58) Field of Classification Search
CPC .......... G08B 6/00; G06F 3/016; G09B 21/003
USPC ....................................... 340/407.1
See application file for complete search history.

(56) References Cited

U.S. PATENT DOCUMENTS

| | | | |
|---|---|---|---|
| 2009/0322498 A1* | 12/2009 | Yun .................. | G06F 3/016 340/407.2 |
| 2012/0062371 A1 | 3/2012 | Radivojevic et al. | |
| 2012/0112894 A1* | 5/2012 | Yang ................. | G06F 3/016 340/407.1 |

(Continued)

FOREIGN PATENT DOCUMENTS

| KR | 10-0590576 B1 | 11/2006 |
|---|---|---|
| KR | 10-2008-0052216 A | 6/2008 |

(Continued)

OTHER PUBLICATIONS

Search Report for International Application No. PCT/KR2013/010234.

(Continued)

*Primary Examiner* — Leon Flores
(74) *Attorney, Agent, or Firm* — LRK Patent Law Firm

(57) ABSTRACT

A haptic device for providing somesthesis by using a magnetic stimulation includes a magnetic field generation unit which generates a magnetic field for providing somesthesis, wherein the somesthesis is provided using a magnetic stimulation.

13 Claims, 11 Drawing Sheets

(56) References Cited

U.S. PATENT DOCUMENTS

2014/0232534 A1* 8/2014 Birnbaum ............... G06F 3/016
340/407.1

FOREIGN PATENT DOCUMENTS

| KR | 10-2011-0030188 A | 3/2011 |
|---|---|---|
| KR | 10-2011-0129647 A | 12/2011 |
| WO | 2008/109058 A1 | 9/2008 |
| WO | 2009/141502 A1 | 11/2009 |

OTHER PUBLICATIONS

Jaakko Malmivuo and Robert Plonsey, "Magnetic Stimulation of Neural Tissue", Bioelectromagnetism—Principles and Applications of Bioelectric and Biomagnetic Fields, Jul. 27, 1995, pp. 375-380, Oxford University Press, New York.

Hiroyuki Kajimoto et al., "Tactile Feeling Display suing Functional Electrical Stimulation", International Conference on Artificial Reality and Tele-Existence, Jan. 1, 1999, pp. 107-114.

European Search Report in connection with the European Application No. 13874460.2 which corresponds to the above-referenced U.S. application, Nov. 8, 2016.

\* cited by examiner

Fig.6
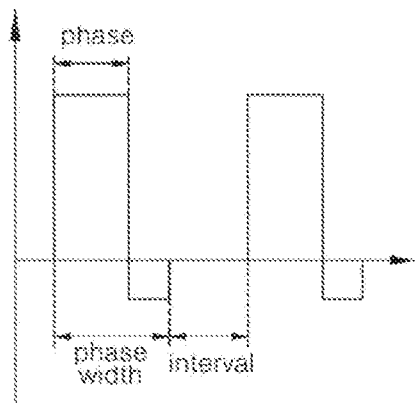
<Biphasic pulse>
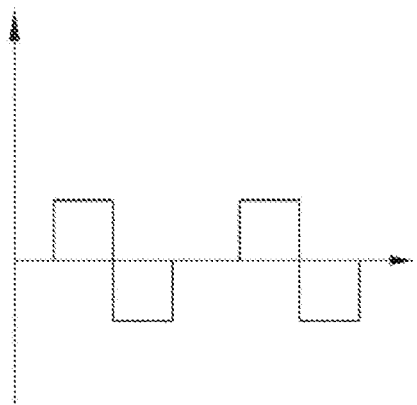
<Symmetrical Biphasic pulse>
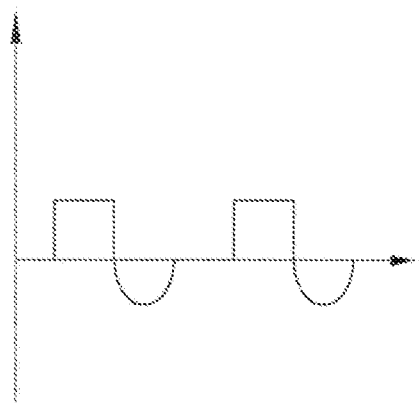
<Asymmetrical Biphasic pulse>
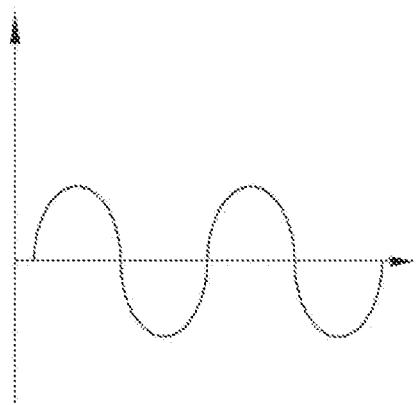
<Sine wave>

HAPTIC DEVICE FOR PROVIDNG SOMESTHESIS BY USING MAGNETIC STIMULATION, AND METHOD USING SAME

TECHNICAL FIELD

The present invention relates to a haptic device for providing somesthesis using magnetic stimulation and, more particularly, to a haptic device capable of providing somesthesis even in a contactless state using magnetic stimulation itself and capable of providing somesthesis to an object (the human body) although a third object is present between the device and the object (the human body).

BACKGROUND ART

A haptic technology is a technology which enables the human body to feel a touch by generating a vibration, a force, or an impact. The importance of such a haptic technology is gradually increased in a User eXperience (UX)-based social atmosphere. The haptic technology is selected as one of 10 technologies capable of changing human life, and the high value of the haptic technology is being evaluated.

As the importance of the haptic technology is increased, various types of haptic devices for providing various types of somesthesis have been developed. Representatively, a haptic device using a vibration device, a haptic device using a thermoelectric element, a haptic device using air pressure, a haptic device using a pin array, a haptic device using ultrasonic waves, a haptic device using a laser, etc. have been developed and used. The haptic devices are being widely used in an overall industry world that requires the suggestion of somesthesis.

However, conventional haptic devices had a limit in performing somesthesis on the assumption of a contact with an object (the human body). Specifically, somesthesis, such as a sense of touch and warm sensation, could be suggested only when an object (the human body) directly comes in contact with a vibration device, a pin array, and a thermoelectric device. The suggestion of somesthesis was impossible in a contactless state.

Furthermore, conventional haptic devices had a limit in that they could not provide somesthesis if an object (the human body) is blocked by a third object. Specifically, if a third object is disposed between an object (the human body) and a haptic device using ultrasonic waves, air pressure, or a laser, the haptic device could not provide somesthesis because the third object blocks the transfer of a stimulation source.

Accordingly, there is a need for a new haptic device capable of solving the problems of such conventional haptic devices. Specifically, there is a need to develop a new haptic device capable of providing somesthesis even in a contactless state and capable of providing somesthesis in the state in which the haptic device has been blocked by a third object.

DISCLOSURE

Technical Problem

An object of the present invention is to provide a haptic technology capable of providing somesthesis using magnetic stimulation itself.

Technical Solution

A haptic device in accordance with an embodiment of the present invention for achieving the above object includes a magnetic field generation unit which generates a magnetic field for providing somesthesis, wherein the magnetic field generation unit provides the somesthesis using magnetic stimulation itself.

Furthermore, in the haptic device in accordance with an embodiment of the present invention, the magnetic field generation unit provides the somesthesis in the state in which the haptic device does not come in contact with an object using the magnetic stimulation itself.

Furthermore, in the haptic device in accordance with an embodiment of the present invention, a third object is disposed between the magnetic field generation unit and the object.

Furthermore, in the haptic device in accordance with an embodiment of the present invention, the magnetic field generation unit is able to provide the somesthesis without coming in contact with the object in the state in which the third object is blocked between the magnetic field generation unit and the object.

Furthermore, in the haptic device in accordance with an embodiment of the present invention, the third object is a display device, and the magnetic field generation unit provides the somesthesis while operating in conjunction with a visual effect of the display device.

Furthermore, in the haptic device in accordance with an embodiment of the present invention, the third object is a harmful object which is able to harm the human body when the third object comes in contact with the human body.

Furthermore, in the haptic device in accordance with an embodiment of the present invention, the magnetic field generation unit is formed in the form of a coil for generating a time-varying magnetic field based on a time-varying current.

Furthermore, the haptic device in accordance with an embodiment of the present invention further includes a power supply unit for supplying a time-varying current to the magnetic field generation unit and a control unit for controlling the operations of the magnetic field generation unit and the power supply unit.

Furthermore, in the haptic device in accordance with an embodiment of the present invention, the control unit changes power, a frequency, or a waveform shape of the current supplied to the magnetic field generation unit depending on the type of somesthesis to be provided.

Furthermore, in the haptic device in accordance with an embodiment of the present invention, the control unit may selectively operate in a plurality of operation modes and may operate in a touch sense mode in which a sense of touch is proposed, a barognosis mode in which barognosis is stimulated, or a warm sensation mode in which warm sensation is stimulated.

Meanwhile, a sensation analysis system in accordance with an embodiment of the present invention for achieving the object includes a haptic device which generates a magnetic field for providing somesthesis and provides the somesthesis using magnetic stimulation itself and the human body response detection device which detects a response from the human body when the somesthesis is provided by the haptic device.

Furthermore, in the sensation analysis system in accordance with an embodiment of the present invention, the haptic device provides the somesthesis in the state in which the haptic device does not come in contact with an object using the magnetic stimulation itself.

Furthermore, in the sensation analysis system in accordance with an embodiment of the present invention, the human body response detection device is electroencephalography (EEG).

Meanwhile, a method for providing somesthesis using the haptic device in accordance with an embodiment of the present invention for achieving the object includes steps of (a) generating, by the haptic device, a magnetic field for providing somesthesis and (b) reaching, by the magnetic field generated by the haptic device, an object in the state in which the object does not come in contact with the haptic device.

Furthermore, in the method for providing somesthesis using the haptic device in accordance with an embodiment of the present invention, a third object is disposed between the haptic device and the object, and the magnetic field generated by the haptic device at the step (b) reaches the object through the third object.

Advantageous Effects

The present invention can provide a haptic device of a new concept which provides somesthesis using magnetic stimulation itself. Accordingly, a new haptic technology having a different paradigm from conventional haptic devices which provides somesthesis based on a vibration motor, a thermoelectric element (Peltier element), a diaphragm, air pressure, a laser, and ultrasonic waves can be provided.

Furthermore, the present invention can provide somesthesis in the state in which the haptic device does not come in contact with an object (the human body) because it can provide somesthesis using magnetic stimulation itself. Accordingly, the present invention can have an advantage in that it is different from conventional haptic devices providing somesthesis to an object on the assumption of a contact with the object.

Furthermore, the present invention can provide somesthesis to an object although a third object is present between the object (the human body) and the haptic device because the present invention can provide somesthesis using magnetic stimulation itself. Accordingly, the present invention can have an advantage different from conventional haptic devices which could not provide somesthesis if an obstacle is present between an object and the haptic device.

Furthermore, the present invention enables a haptic environment of a new method to be implemented it has i) a characteristic in which a sense can be suggested in a contactless state and ii) characteristics in which an obstacle can be overcome and a sense can be suggested. For example, if the haptic device is installed within a display device (TV, a smart phone, etc.), the present invention can implement an environment in which haptic feedback can be provided even in the state in which the human body does not come in contact with a display panel. Furthermore, if the haptic device is installed within a dangerous object that may damage the human body, the present invention can implement an environment in which a danger can be warned through haptic feedback when the human body approaches the corresponding dangerous object. Furthermore, in addition to such an example, the present invention may be used in various ways in various industry fields.

Furthermore, the present invention can change the frequency of current induced to the human body by controlling a generated time-varying magnetic field and can selectively stimulate various types of receptors through such a change of the frequency. Accordingly, the present invention can selectively implement various types of somesthesis handled by corresponding receptors through such selective stimulation. (As a result, various types of somesthesis can be selectively provided using a single haptic device.)

Furthermore, the present invention can provide somesthesis in a large area in addition to a small area by controlling intensity, occurrence frequency, and a generation waveform of a time-varying magnetic field. That is, the present invention can have more excellent characteristics in terms of a stimulation suggestion area (spatial distribution) and stimulation suggestion resolution (spatial resolution) compared to conventional haptic devices.

DESCRIPTION OF DRAWINGS

FIG. 6 is a graph showing examples of various time-varying currents which may be used to generate a magnetic field.

DESCRIPTION OF REFERENCE NUMERALS

Figure 1:
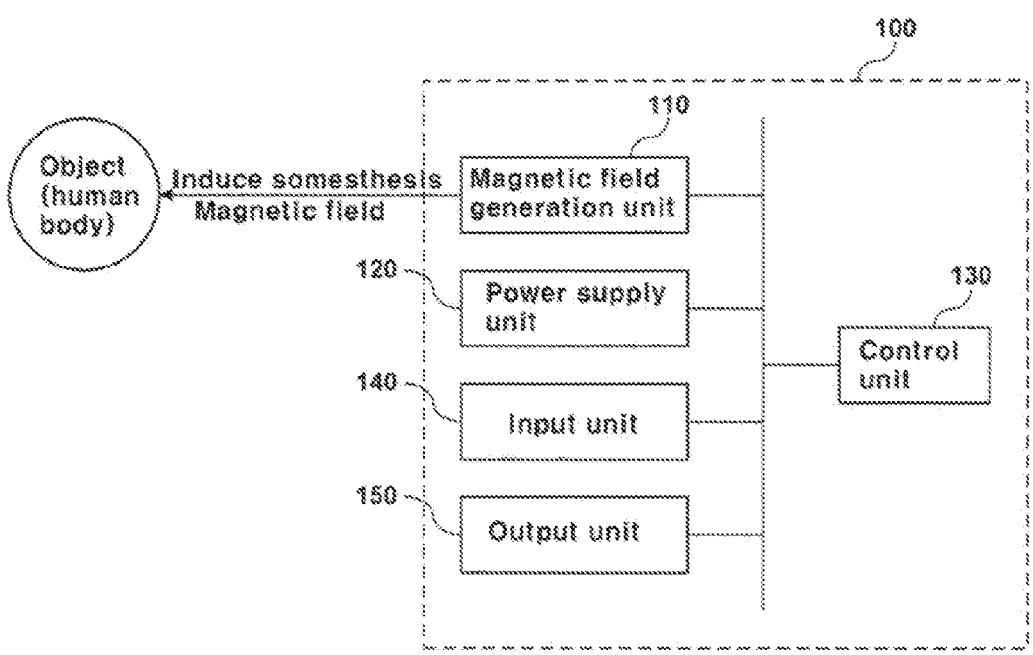
FIG. 1 is a configuration diagram showing the configuration of a haptic device in accordance with an embodiment of the present invention.
Figure 2:
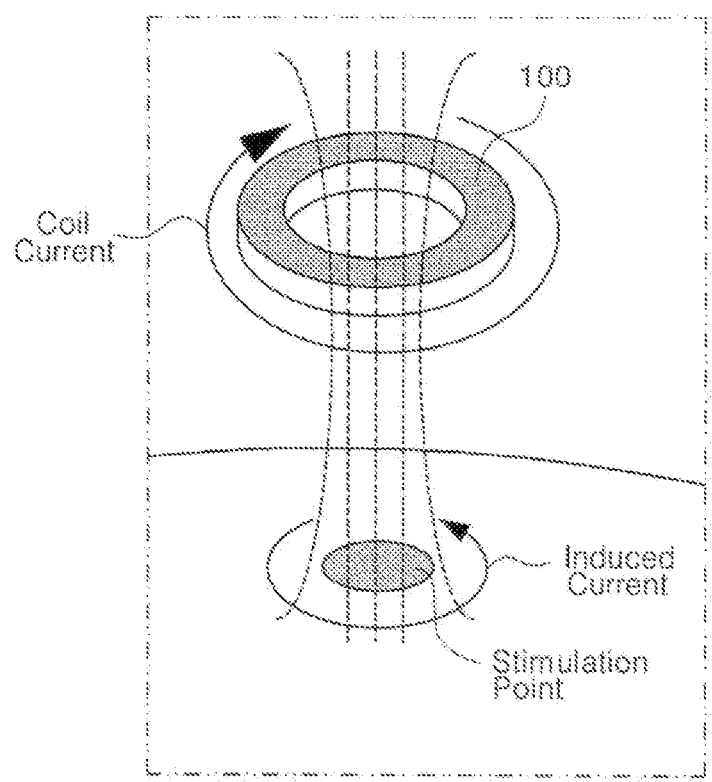
FIGS. 2 and 3 are exemplary diagrams showing a detailed embodiment of a magnetic field generation unit.

100: haptic device
110: magnetic field generation unit
120: power supply unit
122: output means
130: control unit
140: input unit
150: output unit
200: human body response detection device

MODE FOR INVENTION

Hereinafter, a haptic device and a method and system using the same according to the present invention are described in detail with reference to the accompanying drawings. The embodiments to be described are provided in order for those skilled in the art to easily understand the technical spirit of the present invention, and the present invention is not restricted by the embodiments. Furthermore, contents represented in the accompanying drawings have been diagrammed in order to easily describe the embodiments of the present invention, and the contents may be different from forms that are actually implemented.

Meanwhile, elements to be described herein are only examples for implementing the embodiments of the present invention. Accordingly, in other implementations of the present invention, different elements may be used without departing from the spirit and scope of the present invention. Furthermore, each of the elements may be purely formed of a hardware or software element, but may also be implemented using a combination of various hardware and software elements that perform the same function.

Furthermore, it should be understood that an expression that some elements are "included" is an expression of an "open type" and the expression simply denotes that the corresponding elements are present, but do not exclude additional elements.

A haptic device in accordance with an embodiment of the present invention is described below with reference to FIGS. 1 to 7.

The haptic device 100 in accordance with an embodiment of the present invention, unlike existing haptic devices, provides somesthesis using magnetic stimulation itself.

Referring to FIG. 1, the haptic device 100 in accordance with an embodiment of the present invention may include a magnetic field generation unit 110 for generating a magnetic field for providing somesthesis, a power supply unit 120 for supplying current to the magnetic field generation unit, and a control unit 130 for controlling the operations of the magnetic field generation unit and the power supply unit.

Furthermore, the haptic device 100 may include elements, such as an input unit 140 for receiving external data and an output unit 150 for outputting the operation state or operation result of the haptic device. In addition to such elements, various elements that may be included in a common haptic device may be added.

The magnetic field generation unit 110 is an element for generating a magnetic field for providing somesthesis. Such a magnetic field generation unit 110 may be formed of various elements capable of generating a magnetic field, but may preferably be formed in the form of a coil for generating a magnetic field in response to the introduction of current. Furthermore, the coil may be made of various materials, such as a metal material and a superconduction material.

Furthermore, the magnetic field generation unit 110 may preferably generate a time-varying magnetic field under control of a control unit 130. Only when magnetic stimulation is transferred in the form of a time-varying magnetic field, an induced current can be generated within a biological tissue to which the magnetic stimulation is transferred and somesthesis can be provided based on the induced current. A process of providing, by the magnetic field generation unit 110, somesthesis is described in more detail below with reference to FIG. 2. 1) First, a time-varying current is provided to the magnetic field generation unit 110 formed in the form of a coil, a time-varying magnetic field is generated by the time-varying current, and magnetic stimulation is applied to a specific biological tissue (stimulation point) by the generated time-varying magnetic field. 2) When the magnetic stimulation is applied to the specific biological tissue, an induced current is generated within the specific biological tissue. Neurons present in the specific biological tissue have an action potential by the generated induced current. 3) Accordingly, biological receptors are activated by the action potential, and thus somesthesis is generated.

Figure 3:
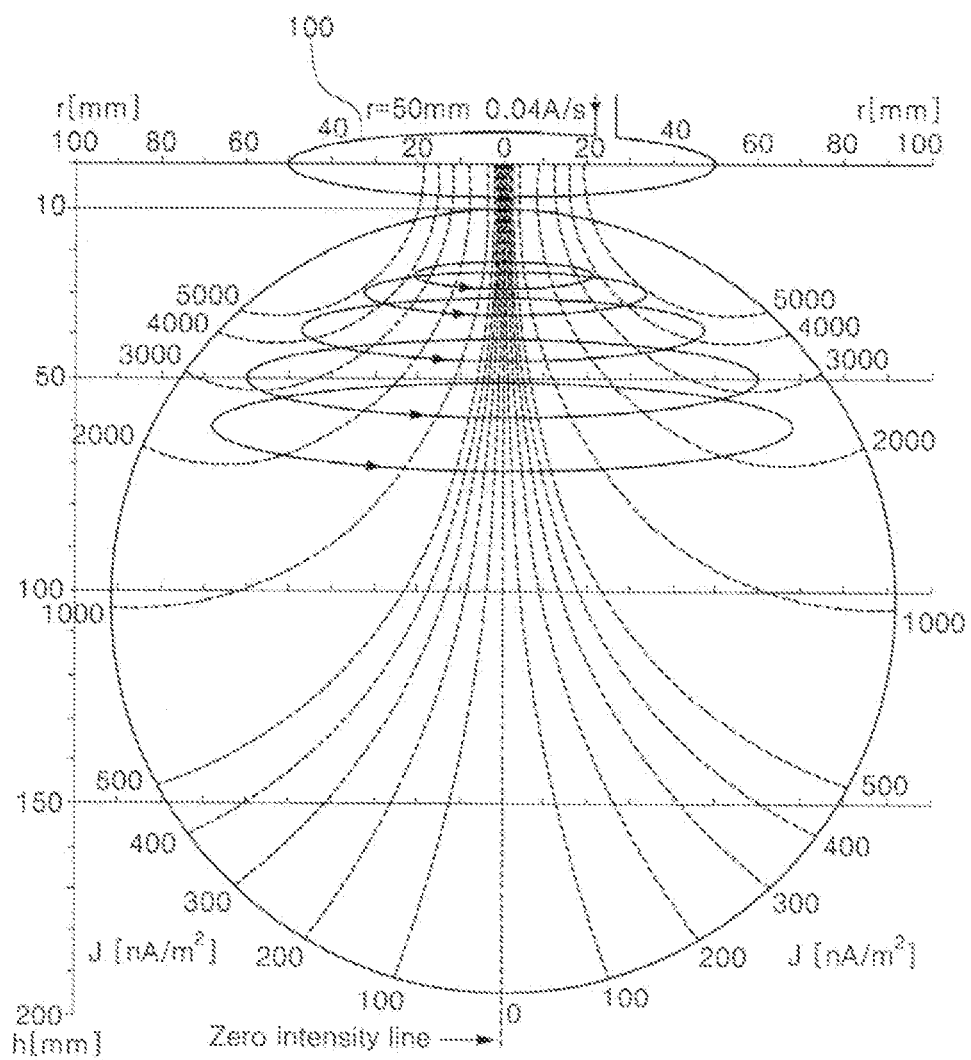
Figure 4:
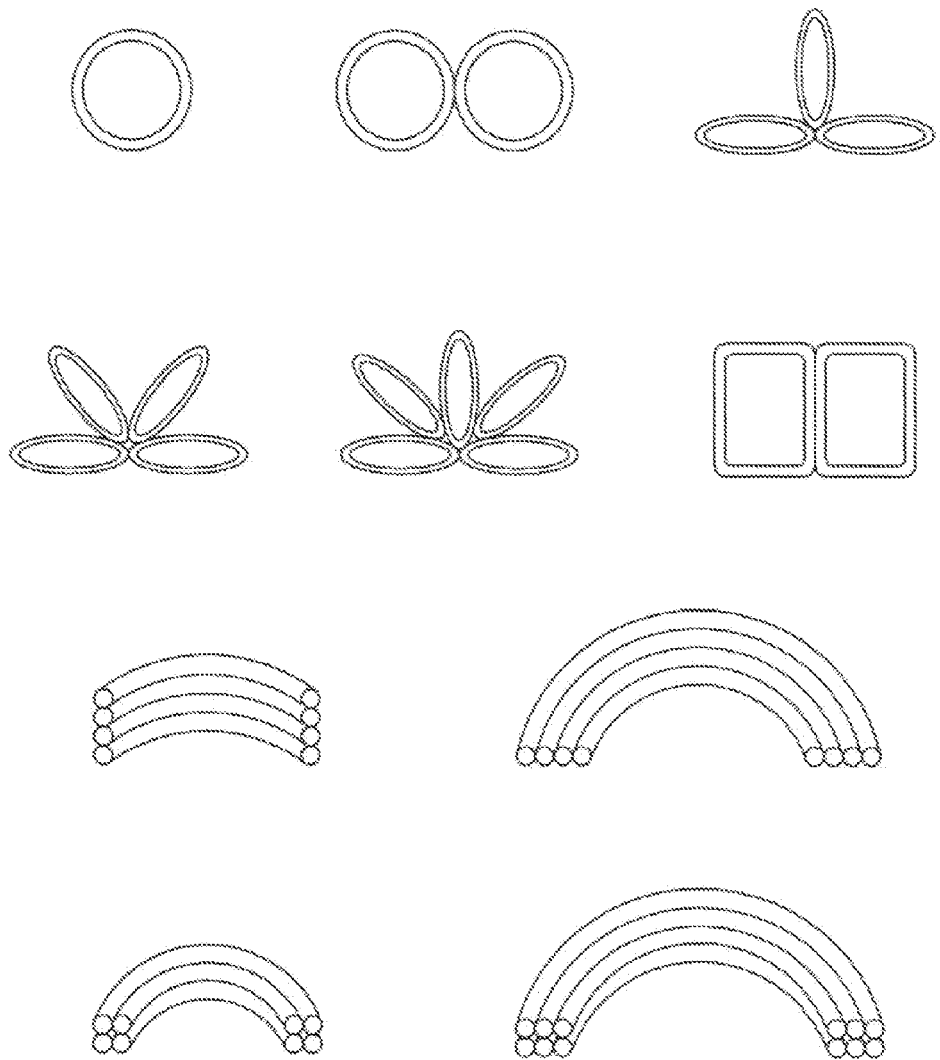
FIG. 4 is an exemplary diagram showing various types of coils which may be included in the magnetic field generation unit.
Figure 5:
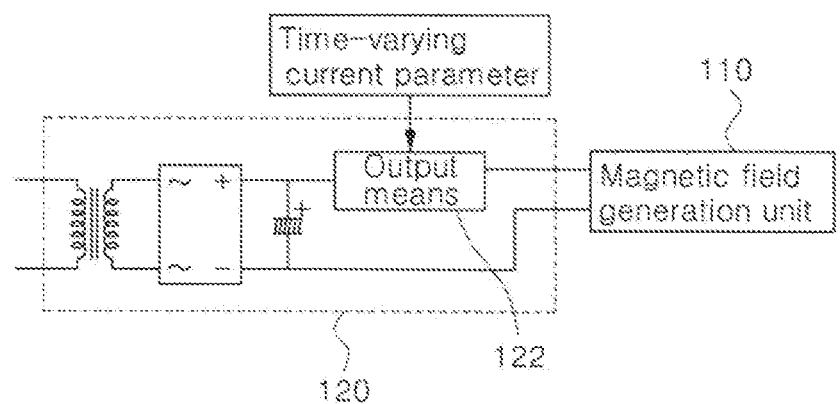
FIG. 5 is an exemplary diagram showing a detailed embodiment of a power supply unit.

Furthermore, the magnetic field generation unit 110 may change the direction in which magnetic stimulation is suggested or change a range in which magnetic stimulation is suggested (a range in which magnetic stimulation of intensity capable of causing somesthesis is suggested) through a change of the disposition of the coil or a change of a time-varying current induced into the coil. Specifically, the direction in which magnetic stimulation is provided may be changed by changing the shape of the coil disposed in a three-dimensional space. The valid range magnetic stimulation (a range in which magnetic stimulation of intensity capable of causing somesthesis) may be changed by changing the intensity and occurrence shape of a magnetic field based on control of the parameters of a time-varying current (control of power, a frequency, occurrence frequency, and the shape of a waveform, etc.). FIG. 3 shows the magnetic field generation unit 110 formed in the form of a coil having r=50 mm, disposed in a horizontal state, and supplied with a time-varying current of 0.04 A/s. The magnetic field generation unit 110 of FIG. 3 may suggest magnetic stimulation downward and may suggest magnetic stimulation of sufficient intensity up to a distance of about 100 mm downward. Accordingly, the magnetic field generation unit 110 of FIG. 3 may be used to provide somesthesis in a range of 100 mm or less downward.

Furthermore, the magnetic field generation unit 110 may include various types of coil. Specifically, the magnetic field generation unit 110 may include various types of coils, such as a circular coil, a square coil, a complex coil in which n coils are combined at a specific angle in a three-dimensional space, and a coil of a solenoid form in which coils having the same radius have been stacked, and a coil of a disk shape in which coils having different radii have been combined on the same plane. Various shapes of coils which may be used in the present invention can be seen from FIG. 4.

Furthermore, the magnetic field generation unit 110 may also have a configuration including a plurality of coils disposed in different shapes or formed in different shapes. For example, the magnetic field generation unit 110 may be configured (example 1) in a shape including both a first coil and a second coil disposed perpendicular to the first coil or may be configured (example 2) in a shape including both a third coil (a square coil) and a fourth coil (a solenoid) having different shapes. In addition to such examples, the magnetic field generation unit 110 may be configured in various shapes including a plurality of coils. Accordingly, various types of magnetic stimulation may be suggested using the plurality of coils. Referring to the aforementioned examples, in the case of the example 1, the magnetic field generation unit 110 may propose magnetic stimulation in a first direction because it includes the first coil and the second coil, may propose magnetic stimulation in a second direction perpendicular to the first direction, or may propose magnetic stimulation in both the first direction and the second direction. Furthermore, in the case of the example 2, the magnetic field generation unit 110 may selectively generate magnetic fields having different magnetic flux density and shapes by selectively driving coils having different shapes and may propose various types of magnetic stimulation even in the state in which the power supply unit 120 generates a constant time-varying current.

The power supply unit 120 is an element for supplying the magnetic field generation unit 110 with current for generating a magnetic field. The power supply unit 120 may include power supply devices, such as a current source circuit and a power converter and may have various shapes including various types of elements. An example of the power supply unit 120 may be seen from FIG. 5.

Furthermore, the power supply unit 120 preferably generates a time-varying current and supplies the time-varying current to the magnetic field generation unit 110. The reason for this is that only when the power supply unit 120 generates the time-varying current as described above, the magnetic field generation unit 110 may generate a time-varying magnetic field for providing somesthesis. Meanwhile, the power supply unit 120 may include output means 122. In this case, the output means 122 may be configured to have a serial or parallel combination of a Silicon Controlled Rectifier (SCR), an Insulated Gate Bipolar Transistor (IGBT), and a Gate Turn-Off thyristor (GTO), that is, power elements for switching.

Furthermore, the power supply unit 120 may change various parameters of a generated time-varying current. Specifically, the power supply unit 120 may change power (amplitude), the frequency, the shape of the waveform, the interval of the waveform, the phase, etc. of a generated time-varying current. The power supply unit 120 may provide various time-varying currents to the magnetic field generation unit 110 through such a change of the parameters. Some examples (the time-varying currents of a biphasic pulse, a symmetrical biphasic pulse, an asymmetrical biphasic pulse, and a sine wave shape) which may be supplied by the power supply unit 120 through such a change of the parameters may be seen from FIG. 6.

Meanwhile, the power supply unit 120 may also be configured to selectively supply a plurality of predetermined time-varying currents. For example, the power supply unit 120 may be configured to selectively supply 1) a time-varying current A having parameters, such as power A, a frequency A, a waveform of a shape A, and an interval A, 2) a time-varying current B having parameters, such as power B, a frequency B, a waveform of a shape B, and an interval B, and 3) a time-varying current C having parameters, such as power C, a frequency C, a waveform of a shape C, and an interval C based on control of the control unit 130.

The input unit 140 means an element for receiving information necessary for the operation of the haptic device 100 from a user. The input unit 140 may receive information about the direction in which somesthesis is suggested, information about the range in which somesthesis is suggested, etc. The input unit 140 transfers pieces of received information to the control unit 130 so that the pieces of received information are used as basic information for controlling the operations of the power supply unit 120 and the magnetic field generation unit 110.

Meanwhile, the input unit 140 may also be formed of various types of input devices, such as a keyboard, a keypad, a mouse, or a touch screen. The input unit 140 may include a plurality of input keys for entering numerical or alphabetical information and setting various types of functions and may also include various function keys for the operation of the haptic device 100.

The output unit 150 is an element for outputting the operation state or operation results of the haptic device 100 or providing a user with specific information. The output unit 150 may be configured to visually display information inputted by a user and information provided to a user in addition to various types of menus, and may include various display devices, including a liquid crystal display and organic light-emitting diodes (OLED). Furthermore, the output unit 150 may be configured to acoustically display the operation state or operation results of the haptic device 100 and may be formed of a speaker device, etc.

The control unit 130 may control various elements of the haptic device 100, including the magnetic field generation unit 110, the power supply unit 120, the input unit 140, and the output unit 150. For example, the control unit 130 may control a time-varying current generated and supplied by the power supply unit 120, may receive information inputted through the input unit 140 and use the received information as basic information, and may output information about the state of the haptic device 100 by controlling the output unit 150. Furthermore, in addition to such an operation, the control unit 130 may control various operations which may be performed by the haptic device 100.

The control unit 130 may include at least one operation means and storage means. In this case, the operation means may be a general-purpose Central Processing Unit (CPU), but may be a programmable device (CPLD, FPGA), an Application-Specific Integrated Circuit (ASIC) or a microcontroller chip suitably implemented for a specific purpose. Furthermore, the storage means may be a volatile memory device, a nonvolatile memory device, a nonvolatile electromagnetic storage device, or memory within the operation means.

Meanwhile, various receptors responsible for various types of somesthesis (a sense of touch, barognosis, warm sensation, etc.) are present within a biological tissue through which the haptic device 100 provides magnetic stimulation. In most cases, the receptors sensitively respond to an induced current having different characteristics (in particular, frequency characteristics). Accordingly, different types of receptors may sensitively respond to each piece of magnetic stimulation because an induced current having different characteristics may be generated if different magnetic stimulation is applied to the human body. Furthermore, since different types of receptors sensitively respond to each piece of magnetic stimulation, different types of somesthesis (warm sensation, a sense of touch, barognosis, etc.) may be cause with respect to each piece of magnetic stimulation.

The haptic device 100 in accordance with an embodiment of the present invention may selectively provide various types of somesthesis by changing a generated magnetic field based on such characteristics. Specifically, the haptic device 100 may selectively provide various types of somesthesis using the power supply unit and the magnetic field generation unit because the power supply unit 120 may selectively supply various types of time-varying currents and the magnetic field generation unit 110 may selectively generate various types of time-varying magnetic fields based on a supplied time-varying current.

In this case, the control unit 130 may operate in a plurality of control modes and may selectively provide various types of somesthesis based on the plurality of control modes. 1) For example, the control unit 130 may selectively operate in touch sense mode for stimulating a sense of touch. In such a touch sense mode, the control unit 130 generates a first magnetic field by supplying a first time-varying current to the magnetic field generation unit 110. In this case, the first magnetic field is a magnetic field for generating an induced current to which receptors (receptors of a Merkel's disc, Meissner's corpuscles, etc.) chiefly responsible for a sense of touch sensitively respond. (a sense of touch proposed in this mode includes a feeling of a vibration) 2) Furthermore, the control unit 130 may selectively operate in a barognosis mode in which barognosis is stimulated. In such a barognosis mode, the control unit 130 generates a second magnetic field by supplying a second time-varying current to the magnetic field generation unit 110. In this case, the second magnetic field is a magnetic field for generating an induced current to which receptors (receptors of Pacinian corpuscles, etc.) chiefly responsible for barognosis sensitively respond. 3) Furthermore, the control unit 130 may selectively operate in a warm sensation mode in which warm sensation is stimulated. In such a warm sensation mode, the control unit 130 generates a third magnetic field by supplying a third time-varying current to the magnetic field generation unit 110. In this case, the third magnetic field is a magnetic field for generating an induced current to which receptors (receptors of Ruffini ending, etc.) chiefly responsible for a warm sensation sensitively respond. As a result, the control unit 130 performs control for changing the power, frequency, shape of a waveform, and interval of the waveform, etc. of a time-varying current supplied to the magnetic field generation unit 110 depending on the type of somesthesis to be provided (a sense of touch, barognosis, warm sensation, etc.). Various types of somesthesis are selectively provided by changing a generated time-varying magnetic field based on such control.

Figure 7:
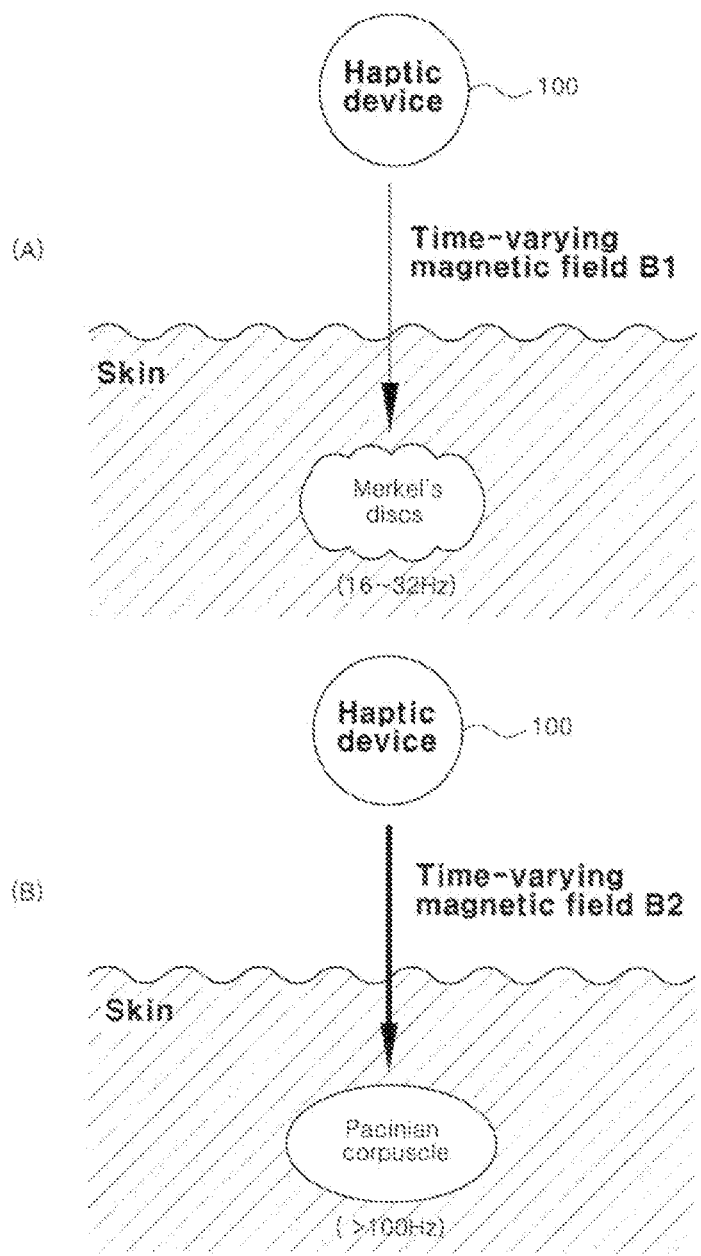
FIG. 7 is a conceptual diagram showing that the haptic device in accordance with an embodiment of the present invention provides various types of somesthesis.

Examples in which the haptic device 100 in accordance with an embodiment of the present invention selectively provides a plurality of types of somesthesis may be seen from FIG. 7.

The upper part of FIG. 7 shows an example in which the haptic device 100 implements a sense of touch. In this case, the haptic device 100 generates a time-varying magnetic field B1 by controlling a time-varying current. In this case, the time-varying magnetic field B1 is a time-varying magnetic field for generating a time-varying induced current of 16 to 32 Hz to which a Merkel's disc sensitively responds. Accordingly, a sense of touch may be provided through magnetic stimulation using such a time-varying magnetic field B1. Furthermore, the lower part of FIG. 7 shows an example in which the haptic device 100 implements barognosis. In this case, the haptic device 100 generates a time-varying magnetic field B2 by controlling a time-varying current. In this case, the time-varying magnetic field B2 is a time-varying magnetic field for generating a time-varying induced current of 100 Hz or more to which Pacinian corpuscles sensitively respond. Accordingly, barognosis may be provided through magnetic stimulation using such a time-varying magnetic field B2.

Meanwhile, the present invention can block somesthesis from being provided by magnetic stimulation if an excessive time-varying current is introduced to the magnetic field generation unit 110 due to an abnormal operation of the power supply unit 120 and there is a danger that excessive magnetic stimulation may be provided due to the introduction of the excessive time-varying current.

Solving means includes a method of further including a protection cover for suppressing the transfer of magnetic stimulation in the haptic device 100 in accordance with an embodiment of the present invention. The protection cover may preferably be made of a material capable of blocking a magnetic field, such pure iron or mu-metal and is preferably configured to surround the magnetic field generation unit 110 under control of the control unit 130. Accordingly, the present invention may use the protection cover if the supply of somesthesis through the haptic device 100 is to be suppressed.

More fundamental solving means includes a method of providing a configuration for detecting a current and a voltage output by or inputted to the power supply unit 120 and the magnetic field generation unit 110 and blocking the transfer of a magnetic field if a predetermined range is exceeded or an abnormal change is detected. In this case, a sensor device may be used. Specifically, a current transformer, a resistor divider, etc. may be used.

Accordingly, somesthesis can be prevented from being provided by abnormal magnetic stimulation and the stability of the human body can be guaranteed through such a blocking operation.

Figure 8:
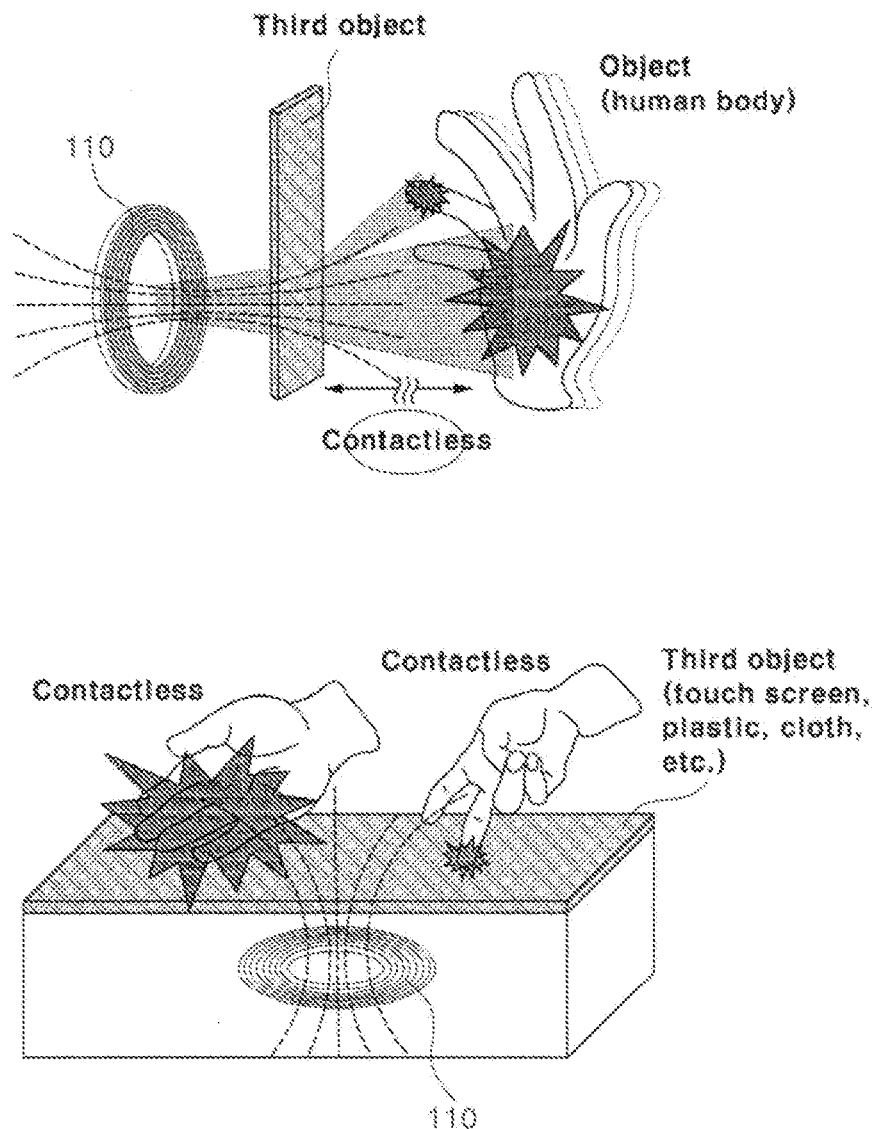
FIG. 8 a conceptual diagram showing that a third object is disposed between the haptic device in accordance with an embodiment of the present invention and an object the human body).

The characteristics of the haptic device 100 in accordance with an embodiment of the present invention are described below with reference to FIG. 8.

The haptic device 100 in accordance with an embodiment of the present invention can provide somesthesis even in a contactless state unlike existing haptic devices. Accordingly, the haptic device 100 can provide haptic feedback to the human body even in the state in which the haptic device 100 does not come in contact with the human body.

Furthermore, the haptic device 100 in accordance with an embodiment of the present invention can provide somesthesis although it has been blocked by a third object unlike existing haptic devices. Specifically, the haptic device 100 can provide somesthesis although it has been blocked by an object having various materials, such as a screen, metal, or synthetic resin. Accordingly, the haptic device 100 can provide somesthesis, such as haptic feedback, even in the state in which the haptic device has not been externally exposed, such as that the haptic device has been installed within a product. (In particular, a characteristic in which the haptic device 100 can provide somesthesis although it has been blocked by a third object is a new characteristic not found in any conventional haptic device, and thus a range in which a haptic technology is applied can be further widened.)

Some examples in which the haptic device 100 in accordance with an embodiment of the present invention may be applied are described below with reference to FIGS. 9 and 10.

The haptic device 100 in accordance with an embodiment of the present invention may be used in various industry fields based on the aforementioned characteristics.

For example, the haptic device 100 may be installed in a specific product and used to provide haptic feedback to a user who approaches the product. In this case, the haptic device 100 can provide haptic feedback without damaging an external appearance of the product and hindering the function of the product because it is not installed on a surface of the product.

Figure 9:
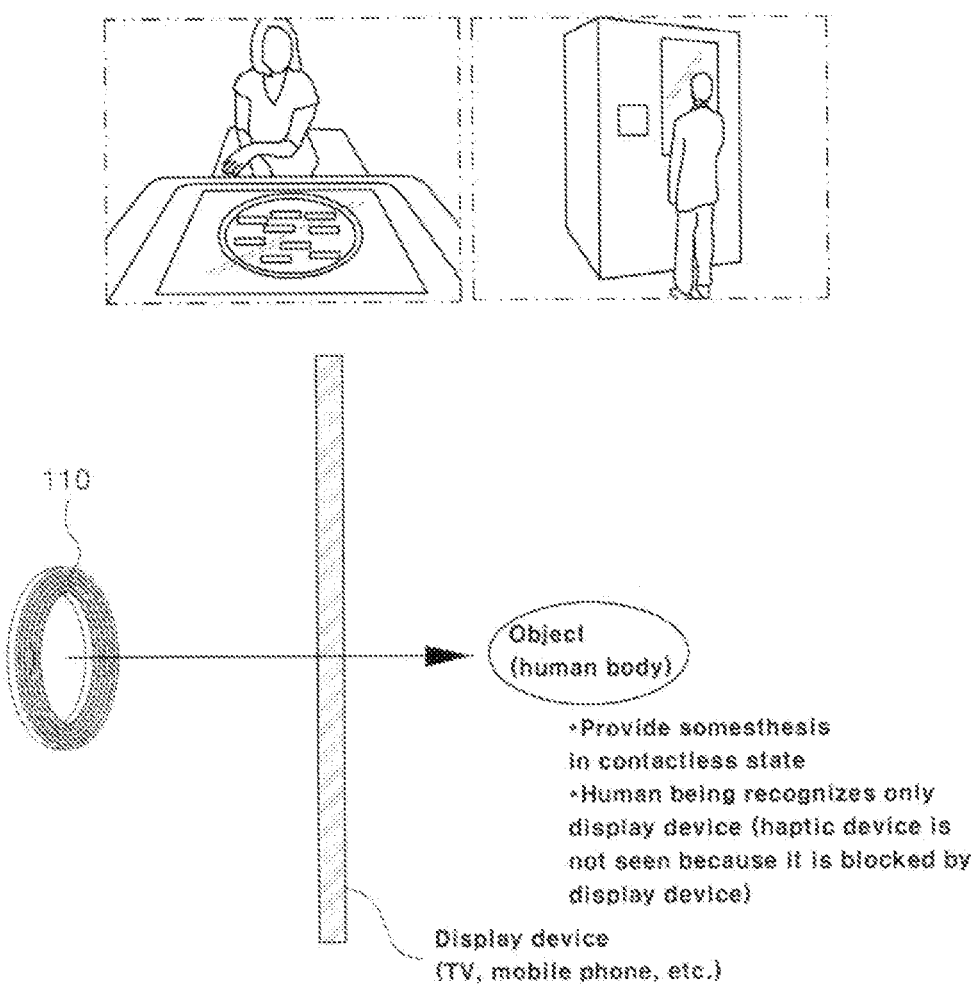
FIGS. 9 to 11 are exemplary diagrams showing some application examples of the present invention.

A representative example of such utilization may be seen from FIG. 9.

In the embodiment of FIG. 9, the haptic device 100 provides somesthesis in the state in which it has been installed within a display device or installed on the opposite side of the display device. Accordingly, in this case, the user of the display device can receive a visual image provided by the display device without interruption and can also be provided with haptic feedback when the user approaches the display device. Furthermore, if the display device is configured in the form of a touch panel, a 'visual image' provided by the touch panel, 'haptic feedback (a sense of touch)' provided by the touch panel, and 'haptic feedback (a sense of touch, warm sensation, barognosis, etc.)' provided by the haptic device 100 can be provided in interoperation.

Furthermore, the haptic device 100 may be installed within a harmful object which may damage the human body or on the opposite side of the harmful object and may also be used to given warning for access to a harmful object.

Figure 10:
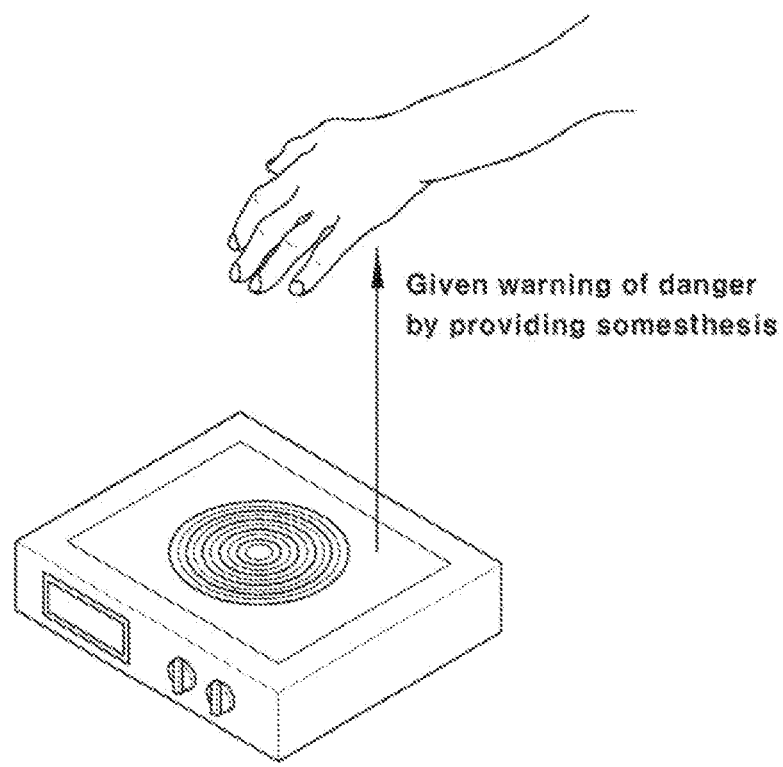

FIG. 10 is an embodiment in which the haptic device 100 has been installed within an induction range. In this case, the haptic device 100 can provide somesthesis (a sense of touch, barognosis, etc.) to a user who approaches the induction range and can awaken the surroundings of the user using such somesthesis.

Meanwhile, in such an embodiment, the induction range may harm the human body only when the temperature of a heating unit is a specific value or higher. Accordingly, the haptic device 100 preferably determines whether the temperature of the heating unit rises to a specific value or higher and provides somesthesis only when the temperature rise is detected.

Figure 11:
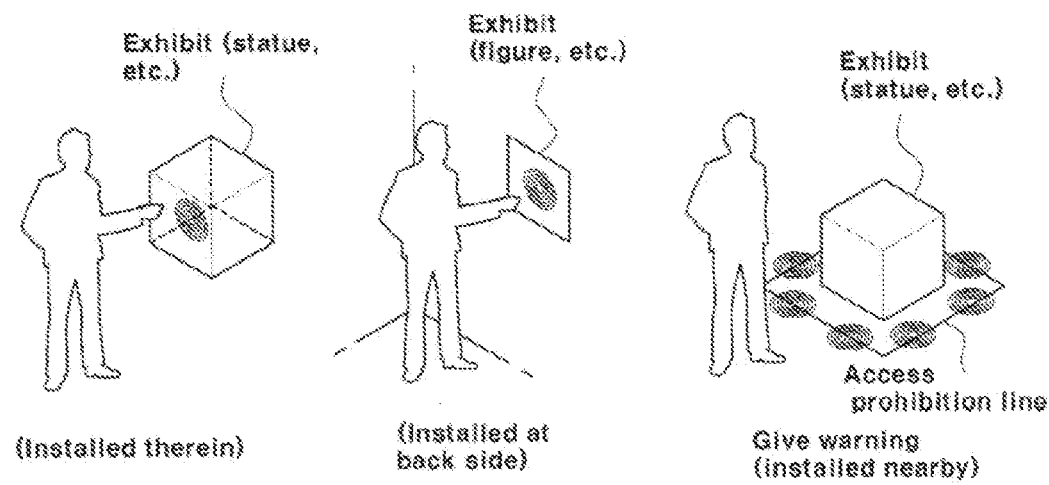

Furthermore, the haptic device 100 may be installed within various objects (e.g., an exhibit in a museum, an exhibition, etc.), around the objects, or at the back of the objects which sublate contact with the human body. The haptic device 100 may provide somesthesis to a user who attempts access to a corresponding object and transfer a warning message according to a tactile sense. Such an embodiment may be seen through FIG. 11.

Meanwhile, researches for investigating characteristics regarding the perception and cognition of somesthesis by giving stimulus, such as barognosis, warm sensation, or a sense of touch, to a testee and monitoring a change in the brain function of the testee using a human body detection device are recently in progress. In order to perform such researches, a sense of touch, barognosis, warm sensation, etc. need to be able to be provided to the human body. In a prior art, research has been performed using separate equipment to thermoelectric element, a vibration element, etc.) for each stimulus to be proposed. Accordingly, there was a problem in that a research device becomes bulky and integrated control is difficult because research devices need to be configured in the state in which a plurality of pieces of equipment has been associated. Furthermore, if two or more pieces of somesthesis are to be complexly provided, two or more pieces of equipment need to be synchronized and a task for accurately matching a target is required. In this process, there is a very high danger of the occurrence of an error.

The haptic device 100 according to the present invention may be used in an experiment apparatus for such researches, and can solve the aforementioned problems. Specifically, the haptic device 100 according to the present invention can prevent hypertrophy of research equipment, can easily perform control, and can have excellent performance from a viewpoint of synchronization and targeting because it can provide various types of somesthesis using magnetic stimulation itself. Furthermore, the haptic device 100 according to the present invention may be subject to experiments in a contactless state or may be subject to experiments in the state in which a third object (a shade) has been disposed between a testee and research equipment. Accordingly, experiments can be performed in the state in which a feeling of insecurity or resistance of testees who participate in search have been reduced. Accordingly, an error of an experiment can be further reduced by preventing a biological response which may be generated by such feeling of insecurity or resistance.

A sensation analysis system which may be used in such researches is described below with reference to FIG. 12.

Figure 12:
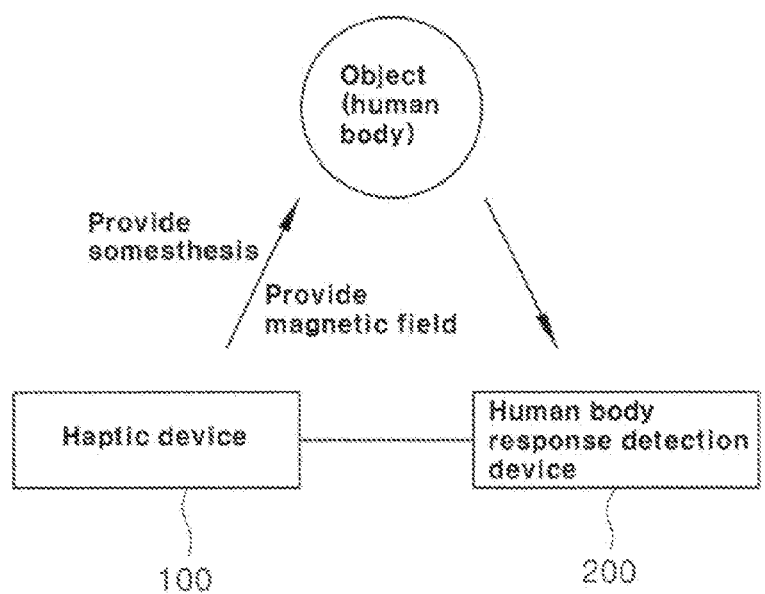
FIG. 12 is a configuration diagram showing the configuration of a sensation analysis system in accordance with an embodiment of the present invention.

Referring to FIG. 12, the aforementioned haptic device 100 may operate in conjunction with a human body response detection device 200. The sensation analysis system may be implemented through such interoperation.

In this case, the human body response detection device 200 is a device for detecting a response from the human body in the state in which somesthesis has been provided and may be configured using various devices, such as electroencephalography (EEG).

Accordingly, the sensation analysis system may be used for research of a human body response to various somesthesis through the interoperation of the haptic device 100 and the human body response detection device 200. Specifically, the sensation analysis system may be used for research of a characteristic (e.g., a perceptive or cognitive characteristic) of the human body which appear stimuli, such as a sense of touch, barognosis, and warm sensation, are provided individually or complexly.

A method for providing somesthesis using the haptic device in accordance with an embodiment of the present invention is described below.

The method for providing somesthesis using the haptic device in accordance with an embodiment of the present invention may include a step of generating, by the haptic device, a magnetic field for providing somesthesis (step a).

Furthermore, after the step a, the method for providing somesthesis using the haptic device in accordance with an embodiment of the present invention may include a step of reaching, by the magnetic field generated by the haptic device, an object that does not come in contact with the haptic device (step b).

Meanwhile, a third object may be disposed between the haptic device and the object. In this case, at step b, the magnetic field generated by the haptic device may reach the object after passing through the third object.

The aforementioned method for providing somesthesis using the haptic device in accordance with an embodiment of the present invention may include substantially the same characteristics as the haptic device 100 according to the present invention although it has a different category from the haptic device 100. Accordingly, although aforementioned characteristic related to the haptic device 100 have not been described in detail in order to avoid a redundant description, the aforementioned characteristic may be easily inferred and also applied to the method for providing somesthesis.

The aforementioned embodiments of the present invention have been disclosed for illustration purposes, and those skilled in the art to which the present invention pertains may perform various modifications, changes, and additions within the spirit and scope of the present invention. Such modifications, changes, and additions should be considered to belong to the claims.

The invention claimed is:

1. A haptic device, comprising: a magnetic field generation unit which generates a time-varying magnetic field based on a supplied time-varying current for providing somesthesis; a power supply unit for supplying the time-varying current to the magnetic field generation unit; and a control unit for controlling operations of the magnetic field generation unit and the power supply unit, wherein the magnetic field generation unit provides the somesthesis using magnetic stimulation itself, and wherein the control unit is able to selectively operate in a plurality of operation modes and to operate in a touch sense mode in which a sense of touch is proposed, a barognosis mode in which barognosis is stimulated, or a warm sensation mode in which warm sensation is stimulated.

2. The haptic device of claim 1, wherein the magnetic field generation unit provides the somesthesis in a state in which the haptic device does not come in contact with an object using the magnetic stimulation itself.

3. The haptic device of claim 2, wherein a third object is disposed between the magnetic field generation unit and the object.

4. The haptic device of claim 3, wherein the magnetic field generation unit is able to provide the somesthesis without coming in contact with the object in a state in which the third object is blocked between the magnetic field generation unit and the object.

5. The haptic device of claim 4, wherein:
the third object is a display device, and
the magnetic field generation unit provides the somesthesis while operating in conjunction with a visual effect of the display device.

6. The haptic device of claim 4, wherein the third object is a harmful object which is able to harm a human body when the third object comes in contact with the human body.

7. The haptic device of claim 2, wherein the magnetic field generation unit is formed in a form of a coil for generating a time-varying magnetic field based on a time-varying current.

8. The haptic device of claim 1, wherein the control unit changes power, a frequency, or a waveform shape of the current supplied to the magnetic field generation unit depending on a type of somesthesis to be provided.

9. A sensation analysis system, comprising: a haptic device which generates a time-varying magnetic field based on a supplied time-varying current for providing somesthesis and provides the somesthesis using magnetic stimulation itself; and a human body response detection device which detects a response from a human body when the somesthesis is provided by the haptic device, wherein the haptic device comprises: a magnetic field generation unit which generates a magnetic field for providing somesthesis, a power supply unit for supplying a time-varying current to the magnetic field generation unit; and a control unit for controlling operations of the magnetic field generation unit and the power supply unit, and wherein the control unit is able to selectively operate in a plurality of operation modes and to operate in a touch sense mode in which a sense of touch is proposed, a barognosis mode in which barognosis is stimulated, or a warm sensation mode in which warm sensation is stimulated.

10. The sensation analysis system of claim 9, wherein the haptic device provides the somesthesis in a state in which the haptic device does not come in contact with an object using the magnetic stimulation itself.

11. The sensation analysis system of claim 10, wherein the human body response detection device comprises electroencephalography (EEG).

12. A method for providing somesthesis using a haptic device, the method comprising steps of: (a) generating, by the haptic device, a time-varying magnetic field based on a supplied time-varying current for providing somesthesis; and (b) reaching, by the magnetic field generated by the haptic device, an object in a state in which the object does not come in contact with the haptic device, wherein the haptic device comprises: a magnetic field generation unit which generates the time-varying magnetic field for providing somesthesis; a power supply unit for supplying the time-varying current to the magnetic field generation unit; and a control unit for controlling operations of the magnetic field generation unit and the power supply unit, and wherein the control unit is able to selectively operate in a plurality of operation modes and to operate in a touch sense mode in which a sense of touch is proposed, a barognosis mode in which barognosis is stimulated, or a warm sensation mode in which warm sensation is stimulated.

13. The method of claim 12, wherein:
a third object is disposed between the haptic device and the object, and
the magnetic field generated by the haptic device at the step (b) reaches the object through the third object.

\* \* \* \* \*